Patented June 9, 1942

2,285,448

UNITED STATES PATENT OFFICE 2,285,448

PREPARATION OF POLYHYDRIC ALCOHOLS

Donald John Loder, Wilmington, Del., assignor to E. I. du Pont de Nemours & Company, Wilmington, Del., a corporation of Delaware No Drawing. Application October 30, 1937, Serial No. 171,891

2 Claims. (Cl. 260—635)

This invention relates to a liquid phase process for the catalytic hydrogenation of derivatives of glycolic acid. More specifically, it relates to a process for the catalytic hydrogenation of glycolic acid, its esters, and anhydrides to a polyhydric alcohol.

An object of the present invention is to provide an exceptionally efficient process for the catalytic, liquid phase hydrogenation of glycolic acid and its derivatives to ethylene glycol. A further object of the invention is to provide a process for hydrogenating glycolic acid and its esters, diglycolic acid, diglycolic anhydride, glycolide and polyglycolides to polyhydric alcohols. Yet another object of the invention is to provide operating conditions which make it possible to obtain substantially quantitative yields of the polyhydric alcohol from glycolic acid derivatives. Other objects and advantages of the invention will hereinafter appear.

I have found that glycolic acid esters may be hydrogenated in the liquid phase in the presence of a hydrogenation catalyst to give substantially 100% yields of polyhydric alcohols while glycolic acid, its anhydrides and the polyglycolides may be hydrogenated to substantially the same extent. The liquid phase hydrogenation is conducted at pressures in excess of 100 atmospheres and preferably above 400 atmospheres with temperatures between 150 and 325° C. Furthermore, for optimum results it is advisable to employ fused hydrogenation catalysts and an excess of hydrogen.

Various methods may be used for carrying out the hydrogenation reaction, for example, the derivative of glycolic acid, together with a suitable catalyst, may be placed in an autoclave provided with adequate stirring means and hydrogen pumped in to give the elevated pressure. The autoclave is then heated to the desired temperature and with stirring the reaction continued until hydrogen absorption has substantially ceased. It has been found that when the reaction is conducted in this manner, with glycolic acid or its derivatives and particularly with alkyl glycolates, and at temperatures in the neighborhood of 225° C., present analytical determinations indicate that substantially all of the compound is converted to ethylene glycol.

Other methods, however, may be employed, for example, an elongated conversion chamber is charged with a fused, metal oxide catalyst which will be more particularly described hereinafter; the glycolic acid or its derivative and hydrogen are passed through the converter, which is maintained at the desired temperature, the hydrogen being introduced under a sufficient pressure head to raise the pressure within the chamber preferably to 400 atmospheres or above. According to the acid or derivative reacted, the time required for the reactants to pass through the converter is regulated between 5 and 60 minutes, preferably between 10 to 25 minutes, the duration of the reaction being governed by the speed with which the acid or derivative treated can be hydrogenated under the conditions used. Under optimum temperature and pressure conditions, it is possible to continuously produce hydroxy alcohols in substantially 100% yields by this method.

I have found that pressures in excess of 400 atmospheres make it possible to obtain surprisingly good yields of the polyhydric alcohol from the glycolic acid derivative. This does not mean, however, that pressures ranging from, say, 100 to 400 atmospheres may not be used. At the lower pressures, however, lower yields are generally obtained and when an attempt is made to increase the yield by extending the reaction time, which, of course, has the disadvantage of decreasing the through-put of a given equipment, decomposition products often counteract much of the advantage derived from longer time of contact. Consequently, while the reaction will go at low pressures I prefer to operate at pressures in excess of 400 atmospheres.

I prefer to employ fused, metal oxide hydrogenation catalysts prepared in accord with the process disclosed in A. T. Larson's copending application Serial No. 171,894 which is effected by fusing, in an electric-resistance furnace, preferably at a temperature between 1000 and 1200° C., 90 mol. per cent of a sulfur-free copper oxide and dissolving in the fused mass substantially 10 mol. per cent of a sulfur-free magnesium oxide; the mixed metal oxides, in pulverized form, may be mixed prior to fusion if desired. The fused catalyst is cooled, crushed and screened to size, it being preferable to employ as the catalyst that which is retained between the 8-14 mesh screens. In place of magnesium oxide, other metal oxides which promote the activity of the copper oxide may be employed such, for example, as an oxide of nickel, iron, cobalt, manganese, chromium, calcium, barium, strontium, potassium, caesium, zinc, cadmium and silver, or mixtures thereof.

Considerable latitude in the temperature of the hydrogenation is possible, although it is preferable to maintain the temperature range for the hydrogenation of glycolic acid, its anhydrides, and glycolides, between 125 and 300° C., while the esters are preferably hydrogenated at slightly higher temperatures, say, between 200 and 325° C., although hydrogenation of the derivatives of glycolic acid, the acid itself may be effected at temperatures as low as approximately 125° C. up to a temperature of approximately 325° C.

Glycolic acid possesses characteristics of both a carboxylic acid and an alcohol and is accordingly capable of forming various types of anhydrides. These may be formed between the alcoholic groups of two molecules, between the carboxylic groups of two molecules, or between an alcohol group of one molecule and the carboxyl group of another. My invention involves the hydrogenation of these compounds and more particularly diglycolic acid, diglycolic anhydride, glycolic anhydride which is an ester formed when glycolic acid is heated at 100° C., as well as glycolide and the polyglycolides of the cyclical and linear polymer types. These compounds do not generally hydrogenate as easily as the esters. If, however, the anhydride of glycolic acid is dissolved in a mono- or polyhydric alcohol such as ethanol, isobutanol, ethylene glycol, or the like, hydrogenation takes place readily. The polyglycolides particularly hydrogenate with facility when they are prepared by removing water, by heating or other means, but not so much that the polyglycolide is rendered insoluble in hot alcohols. A hot monohydric or polyhydric alcohol is then added and more water removed by distillation until substantially all the carboxyl groups have been esterified. Hydrogenation proceeds much more rapidly with the anhydrides of glycolic acid if no unesterified carboxyl groups are present. To hydrogenate the acid it should preferably be dissolved in a monohydric or polyhydric alcohol.

Many of the anhydrides of glycolic acid are solids under normal conditions, and it is generally advisable to put them in solution prior to their hydrogenation. This may be accomplished by dissolving the glycolide in a suitable alcohol such as ethanol, methanol, isobutanol or a polyhydric alcohol such as ethylene glycol or glycerol. In many instances, however, this is unnecessary when the temperature of the hydrogenation is sufficiently high to liquefy the dehydration product.

The esters of glycolic acid which may be hydrogenated by my process include the glycolic acid esters of the monohydric aliphatic alcohols such as methyl, ethyl, propyl, n-butyl, iso-butyl, amyl, hexyl, octyl, decyl, dodecyl, tetradecyl, cetyl, and the like, the branch-chain alcohols containing three or more carbon atoms and produced, for example, in the methanol synthesis, the polyhydric aliphatic alcohols such as ethylene glycol and glycerol, and the aromatic alcohols such as phenol.

The preferred catalyst for the process of this invention is a fused, mixed, metal oxide catalyst prepared as described above and containing copper unpromoted or promoted with one or more of the metal oxides. If the metal oxide mixture is used it should contain, prior to fusion, from 50 to 97 mol. per cent by weight of copper oxide, and from 50 to 3 mol. per cent of the oxide of the other metal or mixture of metals. These fused catalysts may be reduced prior to or during hydrogenation. Other catalysts that are adaptable to applicant's process are those that may be classified as consisting of a hydrogenating metal or its oxide, promoted by the presence of a more acidic metal oxide, especially where the more acidic metal oxide is chromium oxide as, for example, copper chromite. Any mild-acting hydrogenating catalyst, however, may be used, but the success of the reaction will be greatly reduced by inferior catalysts and, accordingly, applicant prefers to use the highly active fused, mixed, metal oxide catalysts.

The more detailed practice of the invention is illustrated by the following examples which describe preferred embodiments of the invention and illustrate the excellent results obtained by conducting the process under high pressures. The parts given are by weight.

*Example 1*

A high-pressure shaker tube was charged with 115 parts of isobutyl glycolate and approximately 70 parts of a reduced, fused catalyst containing 90 mol. per cent of copper oxide and 10 mol. per cent of magnesium oxide, the temperature was raised to approximately 225° C. and hydrogen introduced to give a pressure of 700 atmospheres. The reaction was continued for 30 minutes. A substantially 100 per cent yield of ethylene glycol was recovered.

*Example 2*

The process of Example 1 was repeated with 133 parts of ethyl glycolate using the catalyst and procedure of Example 1. The ester was raised to temperature in 43 minutes, maintained at temperature for 95 minutes under a hydrogen pressure of 900 atmospheres. A high yield of ethylene glycol was obtained.

*Example 3*

The process of Example 2 was repeated using the same catalyst and approximately 106 parts of a charge consisting of the isobutyl ester of glycolic acid. After 60 minutes, at a temperature of 225° C., under a hydrogen pressure of 700 atmospheres, substantially 100% of the ester was converted to ethylene glycol.

*Example 4*

A shaker tube was charged with 187 parts of a glycolic acid anhyride. The anhydride was essentially a polyglycolide which was prepared by partially dehydrating 2.09 mols. of glycolic acid, hot ethylene glycol, 0.53 mol. was then added and the mixture heated until a total of 2.6 mols. (the total amount recovered by heating before and after addition of the alcohol) of water was withdrawn. An unreduced, fused, metal catalyst containing 90 mol. per cent of copper oxide and 10 mol. per cent of magnesium oxide was employed, the reaction being conducted at a temperature of 225° C. and a hydrogen pressure of 900 atmospheres for approximately 69 minutes. A 95% yield of ethylene glycol was obtained.

*Example 5*

The process of Example 4 was repeated with 210 parts of polyglycolide which was obtained by removing 2.8 mols. of water from 2.09 mols. of glycolic acid (via the method of Example 4) in the presence of 1 mol. of isobutanol. This reaction was conducted at a temperature of 225° C. and under a hydrogen pressure of 900 atmospheres for 155 minutes, whereupon a substantially quantitative conversion of polyglycolide to ethylene glycol was realized.

Example 6

A shaker tube was charged with 139 parts of ethyl glycolate and 196 parts of a catalyst containing 90 mol. per cent of copper oxide and 10 mol. per cent of magnesium oxide which had been fused but not reduced. At a temperature of 195 to 215° C. for 17 minutes and under a hydrogen pressure of 900 atmospheres, a high conversion of ethylene glycol was realized.

Example 7

The process of Example 1 was repeated with a charge of 225 parts which contained on a molal basis 6 parts of ethylene glycol and 1 part of glycolic acid. The reaction was continued for 35 minutes at a temperature of about 225° C. and under a hydrogen pressure of about 750 atmospheres a better than 95% conversion was obtained.

From a consideration of the above specification, it will be realized that many changes may be made in the conditions employed without departing from the invention or sacrificing any of the advantages that may be derived therefrom.

I claim:

1. A process for the production of ethylene glycol which comprises hydrogenating an aliphatic alcohol ester of a partially dehydrated glycolic acid while in contact with a hydrogenation catalyst at a temperature between 125 and 325° C. and a pressure in excess of 400 atmospheres.

2. A process for the production of ethylene glycol which comprises hydrogenating an aliphatic alcohol ester of a hot-alcohol soluble polyglycolide in the presence of a hydrogenation catalyst, at a temperature between 125 and 325° C. and a pressure in excess of 400 atmospheres.

DONALD JOHN LODER.